US006880535B2

(12) United States Patent
Sorter et al.

(10) Patent No.: US 6,880,535 B2
(45) Date of Patent: Apr. 19, 2005

(54) CARBURETION FOR NATURAL GAS FUELED INTERNAL COMBUSTION ENGINE USING RECYCLED EXHAUST GAS

(75) Inventors: Richard L. Sorter, Washoe County, NV (US); Gerald H. Dorn, Washoe County, NV (US)

(73) Assignee: Chapeau, Inc., Granite Bay, CA (US)

( * ) Notice: Subject to any disclaimer, the term of this patent is extended or adjusted under 35 U.S.C. 154(b) by 0 days.

(21) Appl. No.: 10/378,736

(22) Filed: Mar. 4, 2003

(65) Prior Publication Data

US 2004/0173192 A1 Sep. 9, 2004

(51) Int. Cl.[7] ............................................. F02B 43/00
(52) U.S. Cl. ..................... 123/528; 123/568.18; 60/614
(58) Field of Search ........................... 123/528, 568.18, 123/568.11; 261/DIG. 12; 60/614, 605.2

(56) References Cited

U.S. PATENT DOCUMENTS

| | | | |
|---|---|---|---|
| 3,580,232 A | | 5/1971 | Sarto et al. |
| 3,646,924 A | * | 3/1972 | Newkirk et al. ............ 123/527 |
| 3,662,722 A | | 5/1972 | Sarto |
| 3,800,766 A | | 4/1974 | Schubeck |
| 3,827,412 A | | 8/1974 | Waitzman |
| 3,874,414 A | | 4/1975 | Dollison |
| 4,526,001 A | | 7/1985 | Burns et al. |
| 4,635,609 A | * | 1/1987 | Seppen et al. .............. 123/698 |
| 5,218,945 A | | 6/1993 | Kapellen et al. |
| 5,672,187 A | | 9/1997 | Rock et al. |
| 6,195,988 B1 | | 3/2001 | Yasui et al. |
| 6,398,921 B1 | * | 6/2002 | Moraski ................. 204/157.43 |
| 6,598,584 B1 | * | 7/2003 | Beck et al. .................. 123/299 |

* cited by examiner

Primary Examiner—Thomas Denion
Assistant Examiner—Zelalem Eshete
(74) Attorney, Agent, or Firm—Meyer & Associates, LLC; Lee G. Meyer, Esq.

(57) ABSTRACT

A carburetion system, without complicated control systems, functions uniformly throughout the range of engine load and incremental increases of power demand to provide efficient stable engine performance for a natural gas fired, internal combustion engine using EGR. A cogeneration system for supplying distributed generation of electricity and process/utility heat, employs a system for engine cooling and effective heat transfer to a cogeneration client, reduces engine head temperature, thereby reducing fuel consumption and reducing pollutants, as well as delivering substantially increased heat to a cogeneration process/utility heat facility by use of a carburetion system which employs at least a pair of spaced apart venturi positioned in series proximate one to another such that a first exhaust recycled gas venturi is upstream of a fuel venturi where fuel and air/exhaust gas are admixed prior to the resultant gas being introduced into a turbocharger. The distance between the exhaust venturi and fuel venturi is affective to provide a given amount of exhaust gas to air ratio prior to entering the fuel venturi inlet. Unexpectedly the spatial relationship between the two venturi, one to the other, affectively regulates exhaust gas air mixture, as well as the air/fuel/exhaust gas mixture to the engine by means solely of pressure increase and decrease (vacuum) of the engine intake system.

60 Claims, 4 Drawing Sheets

CARBURETION FOR NATURAL GAS FUELED INTERNAL COMBUSTION ENGINE USING RECYCLED EXHAUST GAS

BACKGROUND OF THE INVENTION

1. Field of the Invention

The present invention relates generally to carburetion systems for natural gas fueled internal combustion engines; and, more particularly, to venturi carburetion systems for natural gas fueled internal combustion engines using recycled exhaust gas.

2. Description of Related Art

Electric energy generation in this country has lagged behind demand. There are a number of reasons for this, but chief among them is failure of traditional energy producers to replace spent units and capitalize new plants. This has been, in part, due to increased air quality regulations. In addition, new challenges face electric generation security. Events of Sep. 11, 2001 showed this nation its vulnerability to terrorist attack. Vital operations, such as police, medical and civil defense that relied upon the electric power "grid" for service, realized that their needs were susceptible to disruption and viewed stand-alone units, as well as micro grids as a possible solution. These alternatives are fraught with their own problems. Chief among the reasons is a drastic increase in demand. Thus, while energy demand has increased, generating capabilities have not.

In addition to the mismatch between demand and generating capacity, the physical transmission infrastructure necessary to deliver power from geographically remote generating facilities to the consumer's location is unable to support the increased load. Even under today's operating conditions, the transmission grid is subject to stress and occasional failure.

One reason for the growth in demand is the increased use of computers and other technology for industrial and business purposes, as well as personal use. As computer usage continues to grow, the use of power-consuming peripheral technologies, such as printers, cameras, copiers, photo processors, servers, and the like, keep pace and even expand. As business use of computer based equipment continues to rise, as do the number of in-house data servers, outsourced data storage facilities, financial systems, and Internet-related companies requiring constant electrical uptime and somewhat reducing traditional peak demand times, requirement for reliable, cheap, environmentally compliant electrical power, continues to grow.

Other technological advances have also increased electrical energy demand. Increased use of power consuming devices in every aspect of life, from medical to industrial manufacturing robots, as well as innovations in almost every research and industrial field, are supported by increasingly complex technology, which requires more electrical power to function. CAT scans, NMRs, side looking X-rays, MRIs and the like, all take electrical power.

Further, security and reliability of source has become of increasing concern. Grid system vulnerability is a real threat. Strategic industries are looking to cut energy costs, increase reliability, and assure security. This has lead to an interest in distributed market technologies. The potential market for distributed generation has become vast without adequate means for fulfilling this need. Again, inefficiency, reliability, and environmental concerns are major barriers. The compelling economics are made on engine efficiency without the financial benefit of waste heat usage, yet with all of the same customer reluctance to accept hassles. Industry estimates indicate that the existing market for distributed generation is $300 billion in the United States and $800 billion worldwide.

Although most existing distributed generation sites use small gas turbine or reciprocating engines for generation, there are many alternatives that are being considered over the longer term. Technologies, such as micro-turbines, are currently available, but only used at a relatively small number of sites. These newer generators offer some inherent advantages, including built-in communications capabilities. It is anticipated that fuel cells will be available in the next five years, which will provide some highly appealing, environmentally friendly options.

As it stands today however, small gas turbine and reciprocating engines comprise a substantial proportion of existing generator technology in the market and will for some time to come for a number of reasons. Engines provide the best conversion efficiency (40%), and they can operate using non-pressurized gas. Micro-turbines, on the other hand, require compressed gas and conversion efficiency is lower (approximately 30%). These latter generators tend to be used in wastewater and landfill and other specialty sites, where a conventional prime mover is unable to stand up to poor fuel quality. Therefore, for utilities to truly benefit from a distributed generation scheme over the short term, they must look to the existing generator technology to provide a sustainable and affordable solution.

Waste heat utilization or cogeneration is one way to increase overall system efficiency. In the case of most power generation, the waste heat is not used, and the economics are based largely on the cost of the electricity produced (i.e. heat rate is paramount), with little consideration for improved reliability or independence from the electric grid. The anticipated fluctuation in energy costs, reduced reliability, and increasing demand has led end users to consider maximizing efficiency through use of heat from generation of on-site generating-heat capture systems, i.e. cogeneration, or "Combined Heating and Power" (CHP).

Cogeneration of electricity and providing client service heat for space heating and/or hot water from the same unit is one solution. Cogeneration provides both electricity and usable process or utility heat from the formerly wasted energy inherent in the electricity generation. With cogeneration, two problems are solved for the price of one. In either case, distributed electricity generation systems must meet stringent local air quality standards, which are typically much tougher than EPA (nation wide) standards.

On-site cogeneration represents a potentially valuable resource for utilities by way of distributed generation. A utility can increase capacity by turning to a "host" site (e.g. industrial user) with an existing generator, and allow them to parallel with the grid and use their generator capacity to handle peak volumes as well as provide utility and space heat to the host site customers. From the utility's point of view, the key advantages to a distributed generation solution are twofold: improved system reliability and quality; and the ability to defer capital costs for a new transformer station.

For customers who can use the process/utility waste heat, the economics of cogeneration are compelling. The impediment to widespread use is reliability, convenience, and trouble free operation. Cogeneration products empower industrial and commercial entities to provide their own energy supply, thus meeting their demand requirements without relying on an increasingly inadequate public supply and infrastructure.

Unfortunately, to date, the most widespread and cost-effective technologies for producing electricity require burning hydrocarbon-based fuel. Other generating technologies are in use, including nuclear and hydroelectric energy, as well as alternative technologies, such as solar, wind, and geothermal energy. However, burning fuel remains the primary method of producing electricity. Unfortunately, the emissions associated with burning hydrocarbon fuels are generally considered damaging to the environment, and the Environmental Protection Agency has consistently tightened emissions standards for new power plants. Green house gases, as well as entrained and other combustion product pollutants, are environmental challenges faced by hydrocarbon-based units.

Of the fossil fuels, natural gas is the least environmentally harmful. Most natural gas is primarily composed of methane and combinations of Carbon Dioxide, Nitrogen, Ethane, Propane, Iso-Butane, N-Butane, Iso Pentane, N-Pentane, and Hexanes Plus. Natural gas has an extremely high octane number, approximately 130, thus allowing higher compression ratios and broad flammability limits. A problem with using natural gas is reduced power output when compared to gasoline, due mostly to the loss in volumetric efficiency with gaseous fuels. Another problem area is the emissions produced by these natural gas engines. Although, the emissions are potentially less than that of gasoline engines, these engines generally require some types of emissions controls such as exhaust gas recirculation (EGR), positive crankcase ventilation (PCV), and/or unique three-way catalyst.

Still another problem with using natural gas is the slow flame speed, which requires that the fuel be ignited substantially before top dead center (BTDC). In general, most internal combustion engines running on gasoline operate with a spark advance of approximately 35 degrees BTDC where as the same engine operating on natural gas will require an approximate advance of 50 degrees BTDC. The slower burn rate of the fuel results in reduced thermal efficiency and poor burns characteristics.

It is well known that emission reduction for natural gas engines can be accomplished by EGR to make the engines run lean. Numerous systems have been devised to recycle exhaust gas into the fuel-air induction system of an internal combustion engine for the purposes of pre-heating the air-fuel mixture to facilitate its complete combustion in the combustion zone, for re-using the unignited or partially burned portions of the fuel, which would otherwise pass to exhaust and into the atmosphere, and for reducing the oxides of nitrogen emitted from the exhaust system into the atmosphere. It has been found that approximately 15 to 20 percent of exhaust gas recycling is required at moderate engine loads to substantially reduce the nitrogen oxide content of the exhaust gases discharged in the atmosphere, that is, to below about 1,000 parts per million.

Although, the prior art systems have had the desired effect of reducing nitrogen oxides in the exhaust by reducing the maximum combustion temperature as a consequence of diluting the fuel-air mixture with recycled exhaust gases during certain operating conditions of the engine, these systems have not been commercially acceptable from the standpoints of both cost and operating efficiency and have been complicated by the accumulation of gummy deposits, which tend to clog the restricted bypass conduit. Recycling the exhaust systems have also been complicated by the desirability of reducing the recycling during conditions of engine idling when nitrogen oxide emission is a minor problem and progressively increasing wide open throttle when maximum power is required, while progressively increasing the recycling exhaust gases with increasing engine load.

In the usual hydrocarbon fuel type engine, fuel combustion can take place at about 1,200° F. The formation of nitrogen oxides does not become particularly objectionable until the combustion temperature exceeds about 2,200° F., but the usual engine combustion temperature, which increases with engine load or the rate of acceleration at any given speed frequently, rises to about 2,500° F. It is known that the recycling of at least one-twentieth and not more than one-fourth of the total exhaust gases through the engine, depending on the load or power demand, will reduce the combustion temperature to less than 2,200° F. Contaminants in the exhaust resulting from fuel additives desired for improved combustion characteristics normally exit in a gaseous state at combustion temperatures exceeding about 1,700° F., but tend to condense and leave a gummy residue that is particularly objectionable at the location of metering orifices and valve seats in the exhaust recycling or bypass conduit. The thermal nitrogen oxide emission is a direct function of combustion temperature and for that reason is less critical during engine idling when the rate of fuel combustion and the consequent combustion temperature are minimal but tends to be problematic during throttle-up and extended full speed operation.

Thus, prior art cogeneration systems employing internal combustion engines, and specifically, natural gas fueled engines have suffered from the myriad of problems including elevated head temperatures and inability to deliver large quantities of process and/or utility heat to the cogeneration client. Excessive head temperatures lead to inefficient operation and unacceptable environmental conditions, which include excessive use of fuel, as well as significant $NO_x$ production.

Some of the inherent problems with natural gas fueled engines, which utilize EGR techniques to reduce pollution, are a result of carburetion problems, which prevent them from running "lean." Specifically, the natural gas regulators have been unable to supply natural gas to the engine throughout the load cycle while maintaining a fuel to air ratio, which does not starve the engine or alternatively run it to rich. In the former case, the engine stalls; in the later, fuel efficiency and $NO_x$ production become out of limits.

Prior art internal combustion engines operating on natural gas and used as power units to spin electric generators use various types of fuel carburetion, regulation, and introduction systems. One device for carburetion uses a diaphragm, which opens under engine vacuum, to operate a fuel-metering valve, allowing fuel to enter an air-mixing chamber, where it is mixed with air and exhaust gas for combustion. The mixture of fuel/air/recycle gas from the mixing chamber then passes through a throttle regulator, which regulates the flow of the mixture to the engine as a function of load. The diaphragm regulates fuel flow by responding to the changes in vacuum (pressure) at the intake manifold of the engine. In some configurations, an exhaust gas driven turbocharger is used to pre-compress the mixture prior to injection into the cylinder. The use of a turbocharger increases the vacuum on the carburetion unit.

These systems have inherent drawbacks. For one, the diaphragm must be several times the size of the gas inlet. For example, a three-inch diameter inlet could require a diaphragm of 15–18 square inches. For a second, when recycled exhaust gas is used the recycle gas tends to erode the diaphragm. Finally, these systems are prone to diaphragm rupture from engine backfire through the intake system. If the engine is turbocharged, the air/recycle gas/fuel mixture passes through the turbocharger, and then, preferably, through an engine intercooler to cool the compressed air/recycle gas/fuel mixture and into the engine cylinders. The combination of a large diaphragm section, mixing section, and throttle section in the carburetion unit make for a large and bulky apparatus, which must be mounted directly on the engine intake.

Therefore, a more fuel-efficient balanced venturi style fuel/air mixing unit was developed. This style of fuel introduction is now utilized on most natural gas fired, internal combustion engines because it is easy to obtain parts, assemble, and mount to the engine. One drawback is that a separate gas shut-off valve must be installed upstream of the venturi for engine shutdown. Another is flooding from pressurized fuel sources. Finally, the load variations on these systems make fuel regulation upstream of the venturi compelling.

Engines, which utilize this venturi fuel carburetion system, utilize a series of small ports of a size determined by the fuel requirement. Air is drawn into a venturi-mixing chamber by vacuum. If the fuel is under a positive pressure, the chamber floods prior to ignition, which prevents ignition of the engine. Again, a regulator is required upstream of the venturi. One type of regulator employs one or more diaphragms, which respond to variation in engine or burner vacuum. For most applications, this vacuum operated devise works reasonably well because, like a burner, the requirement for fuel is full on or full off.

Prior art EGR carburetion systems have been plagued with a myriad of problems. First, the exhaust gas is usually recycled at elevated temperatures, which increases the head temperature of the engine, unless the gas is cooled. In addition, when the engine is turbocharged, the temperature of the intake admixture is elevated even further by compression. Thermal $NO_x$ is a function of head temperatures, as previously described. Thus, elevated temperatures of intake gases contribute to thermal $NO_x$ production.

Second, carburetion systems for natural gas internal combustion engines that utilize recycled gas must mix recycled exhaust gas in proportion to ambient air in proportion to fuel to affect stoicheiometric conditions in the engine, while maintaining low thermal $NO_x$ and overall energy efficiency. In cogeneration units, where electric load automatically throttles the engine, these ratios of air-to-exhaust and gas-to-fuel can easily become out of proportion because of rapid acceleration/deceleration of the engine.

Thus, carburetion systems for internal combustion natural gas fired exhaust gas recycled engines have, heretofore, been complicated and involved electronic, dynamic feed back, control systems for regulating the fuel, as well as the recycled gas in response to changing engine demands. Since the intake mixture varies with load, too much fuel or too much recycled gas will "choke" the engine. Like wise, too little fuel will "starve" the engine and too little recycle gas will increase thermal $NO_x$ production. All of these conditions cause the engine to be unstable, inefficient, and out of emission compliance.

Therefore, it would be advantageous to have a simple carburetion system, which does not involve complicated control feed back systems, which must be maintained and tuned; eliminates need for mechanical or digital control of varying EGR flow over changing load or RPM; and/or the need for mechanically or electrically driven pumps to properly modulate EGR over changing loads. In addition, it would be advantageous to have a system, which mechanically responds to the engine load requirements by dynamically regulating the fuel, air, recycled gas ratio in the intake mixture as a function, solely of the pressure change created by acceleration/deceleration of the engine. Further, it would be advantageous if such system would operate without creating engine instability in response to almost instantaneous electrical load change. It would also be advantageous to accomplish all of the aforementioned without complicated mechanical linkage or excess parasitic power demands.

It would further be advantageous to have a cogeneration system with reduced fuel consumption, as well as $NO_x$ production, while delivering substantial heat to the process/utility heat cogeneration system. In addition, it would be advantageous to run a lean burning engine using EGR, which results, in not only a lean burn, but also reduced head temperatures, leading to reduced thermal emissions and greater efficiency.

SUMMARY OF THE INVENTION

It has now been unexpectedly discovered that a carburetion system, without complicated control systems, functions uniformly throughout the range of engine loads and incremental increases of power demand to provide efficient stable engine performance for a natural gas fired, internal combustion engine using EGR. In accordance with the invention, a cogeneration system for supplying distributed generation of electricity and process/utility heat, employs a system for engine cooling and effective heat transfer to a cogeneration client, reduces engine head temperature, thereby reducing fuel consumption and reducing pollutants, as well as delivering substantially increased heat to a cogeneration process/utility heat facility. The cooling cycles and process/utility heat radiation configurations of the inventive system maintain cylinder inlet temperature resulting in improved efficiency, reduced thermal $NO_x$ and longer engine life. This allows operation of the engine at optimum inlet and outlet temperatures regardless of cogeneration process/utility heat system requirements, without excessive parasitic pump loads.

In accordance with the invention a cogeneration system for supplying distributed generation of electricity and process/utility heat employs a carburetion system for a natural gas fired internal combustion engine employing EGR. The carburetion system employs at least a pair of spaced apart venturi positioned in series proximate one to another such that a first exhaust recycled gas venturi is upstream of a fuel venturi where fuel and air/exhaust gas are admixed prior to the resultant gas being introduced into a turbocharger. The distance between the exhaust venturi and fuel venturi is affective to provide a given amount of exhaust gas to air ratio prior to entering the fuel venturi inlet.

It has been unexpectedly discovered that the relationship of the two venturi, one to the other, can be used to affectively regulate exhaust gas air mixture, as well as the air/fuel/exhaust gas mixture to the engine by means solely of pressure increase and decrease (vacuum) of the engine intake system.

In accordance with another aspect of the invention, a fuel regulator device communicates with the fuel venturi such that the fuel gas venturi, the exhaust gas venturi, and the gas regulator operate in concert to fuel the engine throughout the load range without need for complex electronic control systems. This system responds to the increase or decrease in pressure created by opening and closing the throttle to create a vacuum through the turbocharger. The system allows the engine to run stoicheiometricaly throughout the load range, while reducing thermal $NO_x$ emissions and maintaining the engine power curve without the necessity of complicated control feed back systems such as electronic solenoids, transducers, computers, and the like.

In accordance with a preferred embodiment, the cogeneration system of the instant invention employs an engine cooling and heating system, which includes a first coolant loop, which directs coolant through the engine block, and a second loop, which directs coolant through the at least one exhaust manifold in cooperation with the first loop, such that the coolant inlet temperature of the first loop is substantially reduced to maintain appropriate engine head temperatures to reduce thermal $NO_x$ while maintaining efficiency. The two loops then merge at a process heat exchanger such that the combined output heat contained in the liquid of the two loops is effective to deliver increased heat to the cogeneration process/utility heat system without an increase in parasitic load, i.e. using the engine internal pump only.

Advantageously, the coolant loops each carry different quantities of coolant to assure engine performance. In one embodiment, the loops can be balanced by means of a dynamic feed back valving to assure head temperatures within a specified range.

In accordance with another aspect of the instant invention, a turbo intercooler/heat exchanger is used to reduce the temperature of compressed engine intake gas, emerging from the turbocharger, prior to its entry into the intake manifold of the engine such that the inlet gas temperature is reduced to retard the formation of thermal $NO_x$. Thus, the engine driven coolant pump can be utilized exclusively for the coolant loop, reducing the parasitic load, while drastically reducing cylinder inlet temperature resulting in improved efficiency, lower thermal $NO_x$ and longer engine life.

In another aspect an EGR cooling circuit using air finned heat exchangers is used to reduce the temperature of the recycled exhaust gas, prior to its mixing with the intake gases for combustion. This further reduces cylinder inlet temperature resulting in improved efficiency, lower thermal $NO_x$, and longer engine life.

In accordance with the invention, a dump/balance radiator is used to remove heat not transferred to the cogeneration process/utility heat system such that engine efficiency is maintained even in the absence of the cogeneration process/utility heat system load.

BRIEF DESCRIPTION OF THE DRAWINGS

The following drawings form part of the present specification and are included to further demonstrate certain embodiments. These embodiments may be better understood by reference to one or more of these drawings in combination with the detailed description of specific embodiments presented herein.

DETAILED DESCRIPTION OF THE PREFERRED EMBODIMENTS

Figure 1:
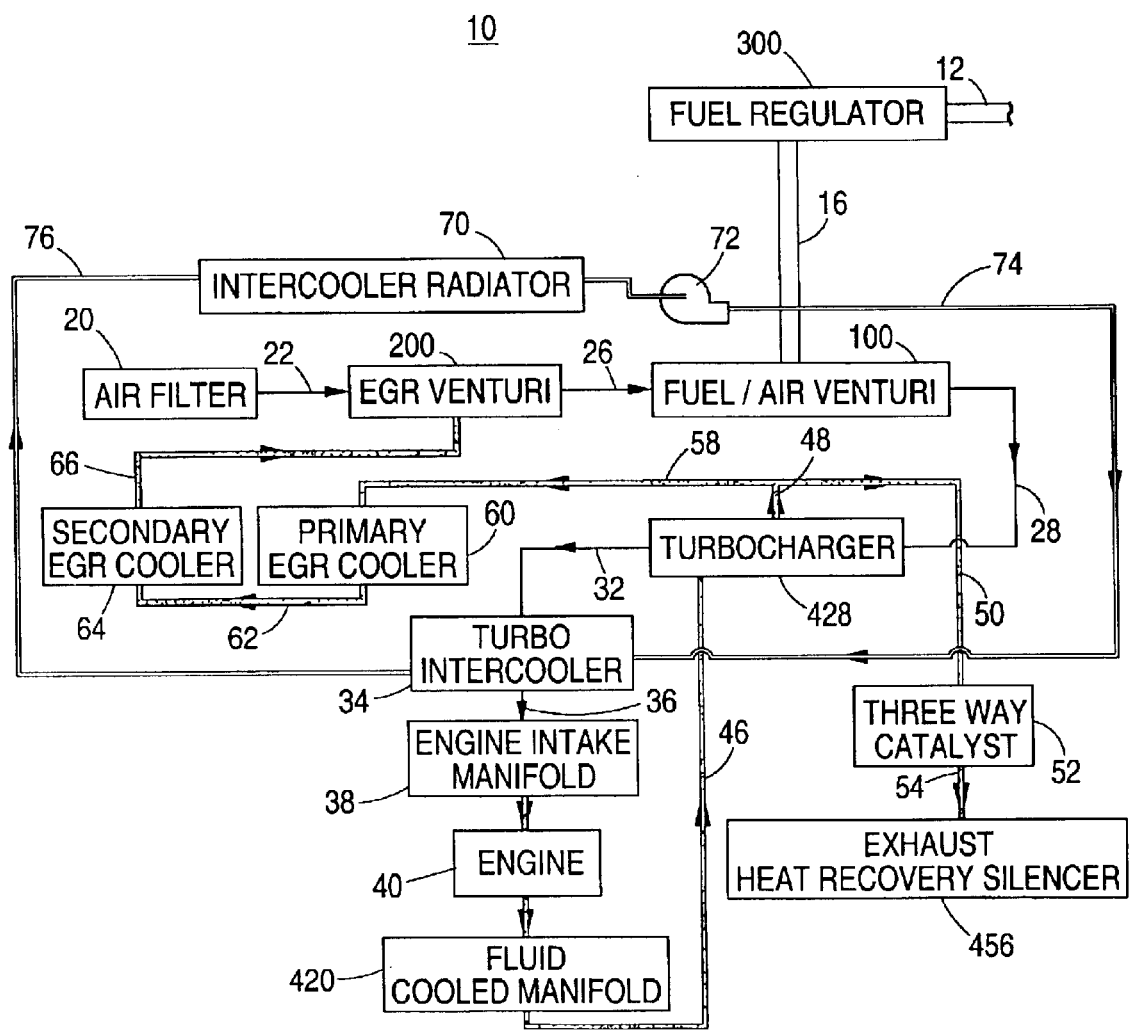
FIG. 1 is a flow chart detail of an example integration of EGR air venturi; the exhaust gas recycle/air-fuel venturi; the fuel regulator system of the instant invention with a turbocharger intercooler radiator loop interface, the engine intake gas system and the engine exhaust system.

In accordance with the instant invention a natural gas fueled, internal combustion engine, employing EGR, delivers power to spin a coupled electric turbine, as well as heat of combustion, through a heat exchanger, to a cogeneration process/utility heat loop for on site use as heat for process water, utility heat, space heat, potable hot water, and the like. This is accomplished with the instant system by increasing the transfer of engine heat to the cogeneration process/utility heat loop while maintaining the engine, and, especially, the head temperature low enough to increase efficiency and reduce thermal $NO_x$ to acceptable levels, even in the presence of the EGR. Even in the presence of EGR, moreover, there is substantially no increase in parasitic power requirements, such as adding external pumps to increase the flow through the heat exchanger.

Further, the carburetion system of the instant invention employs two venturi in a spaced apart relationship, which deliver air, fuel, and recycle exhaust gas to the engine in response to increase and decrease in intake manifold pressure as the engine responds to increased and decreased loads. A fuel regulator for natural gas fired cogeneration unit regulates natural gas, under pressure, from a remote fuel source, such as a tank, to an carburetion device where the fuel is mixed with air and exhaust gas for intake into the cylinders of an internal combustion engine.

In accordance with one aspect of the invention, recycle exhaust gas is admixed with the air and fuel to reduce $NO_x$ emissions from the engine, as will be further explained below. In accordance with a further aspect, the engine is supercharged by, for example, an exhaust gas driven turbocharger, to enhance engine performance. When the engine is turbocharged using EGR, the exhaust gas is mixed with combustion air upstream of the fuel venturi, and then admixed with fuel by, for example, a fuel venturi. Advantageously, the turbocharged mixture of hot exhaust gas, fuel, and air is cooled prior to entrance into the engine cylinder to reduce head temperature, and thus, $NO_x$ emissions from the engine.

The fuel regulator can comprise one or more sections or elements to regulate flow of the pressurized fuel into the carburetor. In accordance with the invention, a first gas metering chamber is provided to meter the flow of gas, dynamically, in response to the requirements of the engine by means of incremental changes in vacuum pressure from the carburetion device. A second gas flow-restricting chamber, downstream of the metering chamber, but in gas communication therewith, is provided to restrict the flow of gas by means of a manual set valve, which is used to "tune" the engine and is manually set and maintained. An upper diaphragm responds to incremental vacuum changes from load variation and induces the lower diaphragm to modulate fuel flow to the venturi to maintain engine RPM during load changes.

In accordance with the invention, an engine coolant loop flow is split so that a first portion flows through the engine block, by way of the engine oil cooler, and through a thermal valve control to the fluid process heat exchanger. A second portion flows to at least one fluid cooled exhaust manifold by way of the engine oil cooler, for example, through the inlet ports of the left and right liquid cooled exhaust manifolds and then the inlet port of the fluid cooled turbocharger where it merges with the liquid from the first loop prior to going through the fluid process heat exchanger, which delivers heat to the cogeneration process/utility heat system.

Thus, in accordance with one embodiment, the coolant flows through a cooling loop by way of an engine driven pump through the oil heat exchanger. Exiting the oil heat exchanger, it splits into two parallel loops. One loop follows a path through the engine block, and the other through the coolant manifold, and then the coolant cooled turbocharger. Both coolant flow loops converge at the thermal control valve where they blend back together to form a single stream prior to flowing through the fluid process heat exchanger. The thermal control valve senses the blended stream temperature and bypasses the fluid process heat exchanger if the temperature is below the threshold engine block inlet temperature of, for example, 175° F. This closed loop prohibits flow through the fluid/process heat exchanger and dump/balance radiator to retard heat loss until optimum engine block inlet temperature is achieved. When the temperature is greater than, for example, 175° F., flow through the control valve is first diverted partially to the fluid/process heat exchanger and then fully to the fluid/process heat exchanger as operating temperatures are reached.

The combined flow is, thus, through the coolant/process heat exchanger for use in heat exchange with the cogeneration process/utility heat system. This parallel cooling loop increases the engine cooling loop heat available to the process/utility heat system, significantly, while maintaining favorable engine operating conditions. In this manner, the coolant through the second loop is at a higher temperature, but a lower flow rate, while the coolant through the first is at a slightly lower temperature, but a higher flow rate to keep the cylinder heads cooler, thus, increasing efficiency and reducing thermal $NO_x$ emissions.

In accordance with a further aspect, the system employs a separate loop to cool supercharged engine inlet feed. This separation of the intercooler liquid coolant loop from the engine coolant loop provides a separate heat exchanger upstream of the engine intake manifold to reduce engine intake temperatures, drastically reducing head temperatures within the engine. Likewise, in a further aspect, the exhaust recycle gas is cooled by at least one air cooled radiator prior to admixing it with air and fuel, which is then compressed in the supercharger.

The power source compatible with the instant invention is a natural gas fueled, internal combustion liquid cooled engine, wherein at least a portion of the exhaust gas is recycled to reduce $NO_x$. For example, a Deutz brand Engine Model BE 8 M1015 GC engine manufactured by Deutz. The natural gas fired internal combustion engine is the prime mover of the electrical generation system, having liquid coolant flow system with a required return coolant at a temperature to reduce head temperature to less than about 1,800° F. The internal engine pump moves the coolant through the various engine components and then through the process heat exchanger to transfer heat to the cogeneration process/utility the system.

Carburetion/Exhaust System

As shown in FIG. 1, there is carburetion/exhaust system 10. In accordance with carburetion/exhaust system 10, there is an upstream EGR venturi 200, a downstream fuel/air venturi 100, and a fuel regulator 300, which comprise the carburetion system of the instant invention. As further shown in FIG. 1, the intake loop interfaces with the turbo intercooler 34 cooling circuit, the turbocharger 428, the engine intake manifold 38, and the recycled exhaust gas (EGR) system. This interaction is advantageous in that head temperatures, gas inlet temperatures, and exhaust gas recycle temperatures can be tuned. It is also advantageous in that the throttle linkage from electrical generator opens and closes a valve, for example, a butterfly valve, which increases or decreases the engine intake of fuel/air/EGR and, in turn, creates a pressure variation at the outlet of fuel/air venturi 100 as will be further described herein.

In accordance with FIG. 1, ambient outside air passes through air filter 20 and intake conduit 22 to EGR venturi 200, where air is mixed with recycled exhaust gas from conduit 66, as will be more fully described. EGR venturi 200 is upstream of fuel/air venturi 100. Mixed air and exhaust gas exits EGR venturi 200 through intake conduit 26 into fuel/air venturi 100 where the air/exhaust gas mixture entrains fuel from fuel regulator 300. Fuel regulator 300 is connected to a fuel source (not shown) by means of conduit 12. Fuel regulator 300 communicates with fuel/air venturi 100 by means of fuel line 16. The fuel/air/exhaust gas mixture exits fuel/air venturi 100 via turbocharger intake conduit 28 and is compressed in turbocharger 428. The turbocharger, which is operated by engine exhaust, creates a vacuum on turbocharger intake conduit 28 which is translated back through the system to operate the fuel regulator, as will be further described.

The compressed fuel/air/recycled exhaust gas mixture exits turbocharger 428 through turbo intercooler intake conduit 32 into turbo intercooler 34 where it is cooled from 400° F. to 165° F. Intercooler radiator 70, pump 72, and coolant circulating conduit 74 continually circulate coolant, in a closed loop, through turbo intercooler 34 to cool the compressed fuel/air/recycled exhaust gas mixture. The cooled intake gas (exhaust gas/air/fuel) exits turbo intercooler 34 into engine intake manifold 38 via engine intake conduit 36 and through engine intake manifold 38 into engine cylinders 40.

Exhaust gas from engine cylinders 40 exits into fluid cooled manifold 420, as more fully described below, and enters the turbine side of turbocharger 428 through exhaust conduit 46 to power the turbocharger 428, thus compressing the fuel/air/recycled exhaust gas mixture entering turbocharger 428 by means of turbo intercooler intake conduit 32, as previously described. As can be seen, exhaust gas exiting turbocharger 428 is split into a recycled stream and an exhaust stream. The exhaust stream, moved via conduit 50, enters three-way catalyst 52 and then by way of conduit 54 to exhaust heat recovery silencer 456. One skilled in the art will realize that the exhaust heat recovery silencer 456 is on the cogeneration process/utility heat system and provides additional heat recovery for that system (see FIG. 5). A portion of the exhaust gas to be recycled passes through conduit 58 to primary air cooled EGR cooler 60; and, if necessary, secondary air cooled EGR cooler 64 by means of conduit 62 and then passes into EGR venturi 200 through conduit 66.

The pressurization of the air/exhaust gas/fuel mixture by turbocharger 428 creates a vacuum upstream, as previously described. As fuel is pulled through fuel/air venturi 100, it creates a vacuum, which is transferred through fuel line 16 to fuel regulator 300 of the carburetion/exhaust system 10, in accordance with the instant invention.

Venturi System

Figures 2, 3:
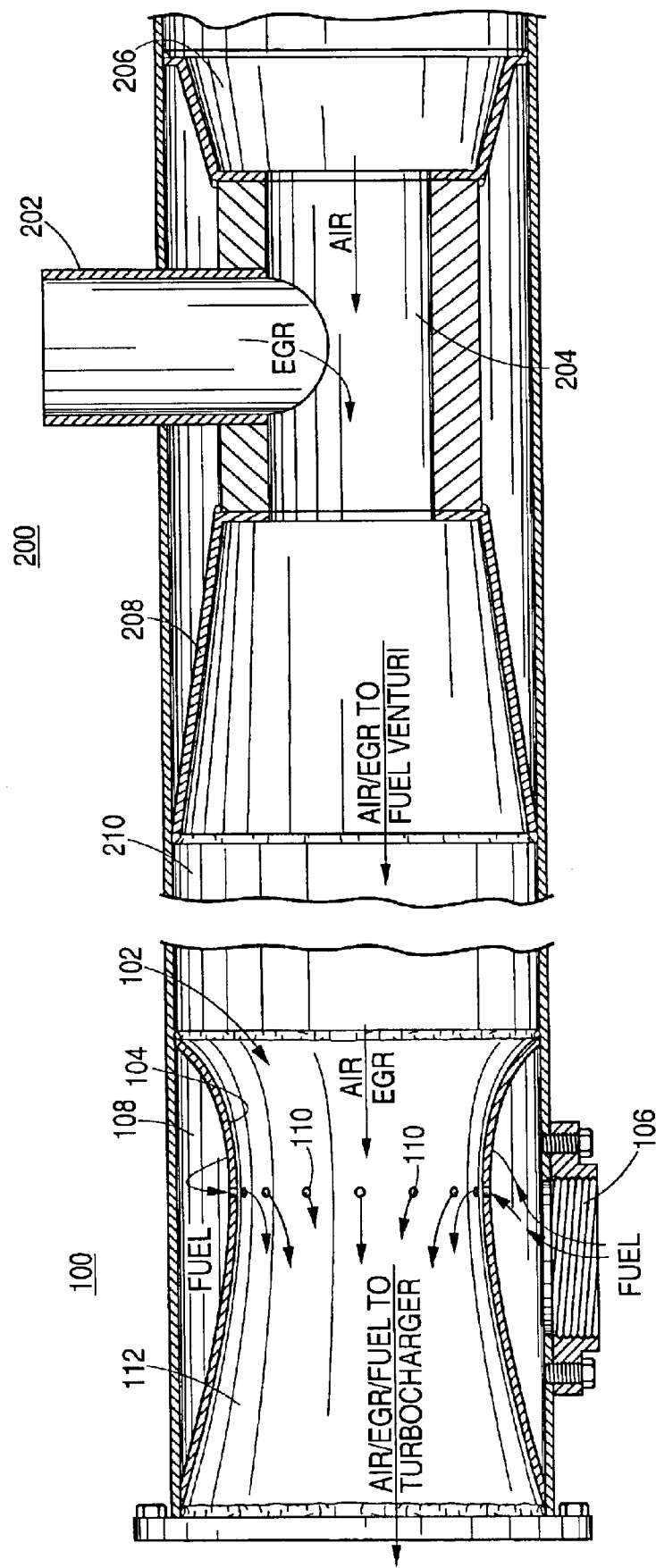
FIG. 2 is a sectional view, along the direction of gas flow, of the upstream venturi for admixing recycled exhaust gas with air in accordance with the instant invention.
FIG. 3 is a sectional view, along the direction of gas flow, of the downstream venturi for admixing recycled exhaust gas and air with fuel in accordance with the instant invention.

As shown in FIG. 2, there is a fuel/air venturi 100 having an air EGR inlet port 102 narrowing to a throat 104 wherein fuel from a fuel regulator (See FIG. 4) flows through fuel line 16 and enters by means of conduit 106 through an opening in the venturi housing to circumferentially disposed fuel distribution conduit 108, which communicates with numerous fuel injection ports 110. The air EGR admixture entering air EGR inlet port 102 is compressed through throat 104 wherein fuel from fuel injection ports 110 is admixed there with to form an air/EGR/fuel mixture, which exits throat 112 to turbocharger 458, as seen in FIG. 1. In operation, the engine is throttled by means of an appropriate valve to open an intake manifold inlet on the engine (not shown) to cause the turbocharger 458 to provide increased fuel/gas/EGR admixture, thus creating a vacuum at air EGR inlet port 102. The fuel in circumferentially disposed fuel distribution conduit 108, under pressure, is continually regulated by a fuel regulator 300, described herein below, to cause appropriate portions of fuel and air/exhaust gas to be admixed in fuel/air venturi 100.

Turning to FIG. 3, there is shown an EGR venturi 200, which is located upstream of fuel/air venturi 100, having an EGR inlet conduit 202 which communicates with mixing chamber 204, as shown. Air from an air filter 20 (FIG. 1) enters rear venturi throat 206 and passes by way of mixing chamber 204 passed the end of EGR inlet conduit 202, which protrudes into the air stream created in mixing chamber 204 to aspirate EGR from EGR inlet conduit 202. The air/EGR admixture then passes into exit throat 208 and by means of a intake conduit 26 enters fuel/air venturi 100, as previously described.

In operation, upstream EGR venturi 200 and downstream fuel/air venturi 100 are placed in a spaced apart relationship, one to the other, wherein the distance from the EGR inlet conduit 202 and the fuel injection ports 110 is affective to create an aspiration of EGR to provide sufficient EGR (about 20%) to maintain a lean burn condition in the engine (not shown). Thus, EGR venturi 200 and fuel/air venturi 100 operate in concert with fuel gas regulator, as described below. Turbocharger inlet pressure regulates the flow of EGR gas ratio to air and subsequently EGR/air ratio to fuel in order to stoicheiometricaly fire the internal combustion engine.

Gas Regulator

Figure 4:
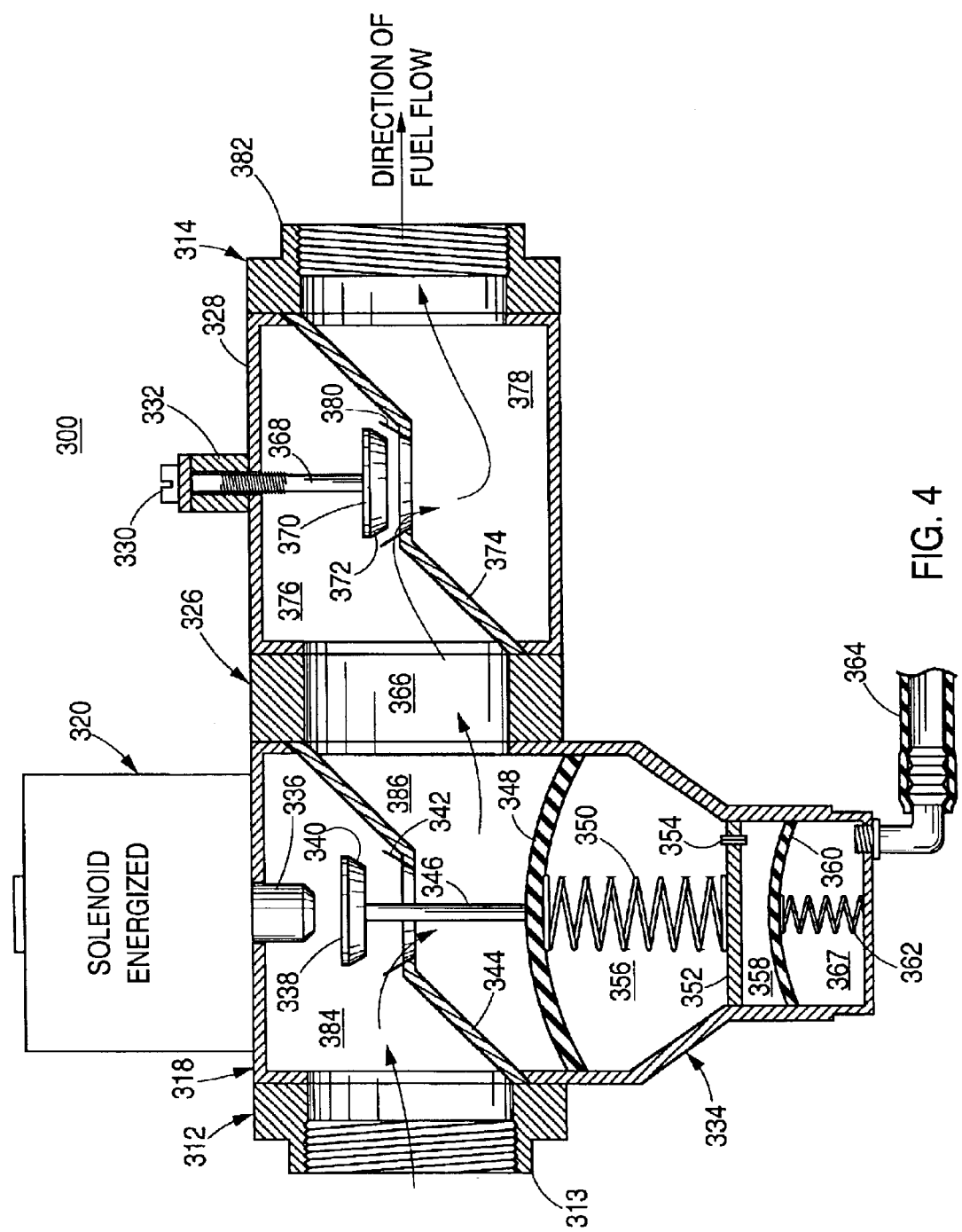
FIG. 4 is a sectional view, along the direction of fuel flow, of the fuel regulator in accordance with the instant invention; and, FIG. 5 is a is a flow chart of the heat transfer systems for cogeneration of the instant invention.

Turning to FIG. 4, there is shown a cutaway of fuel regulator 300. FIG. 4 shows the internal workings of the fuel regulator 300 when the solenoid is activated. Inlet-coupling element 312 carries threaded nipple 313 and communicates with gas metering/shutoff component 318, as shown. Gas metering/shutoff component 318 has mounted thereon a solenoid housing 320, which contains a solenoid (not shown) to actuate solenoid actuation rod 336, and a diaphragm housing 334, containing the gas regulating membranes, as will be further described.

Solenoid actuation rod 336, the end of which contacts metal contact plate 338, which, in turn, is seated upon fuel regulating valve 340. Fuel regulating valve 340 sealably engages valve seat 342, when the solenoid housing 320 is de-energized (not shown), all gas flow is shut-off through fuel regulator 300. Within gas metering/shutoff component 318 is a solid partition 344, which divides gas metering/shutoff component 318 into an upper gas receiving chamber 384 and a lower gas receiving chamber 386 and contains valve seat 342 therein, such that when fuel regulating valve 340 is fully seated in valve seat 342, gas flow is shut off. In operation, with the solenoid energized, as shown in FIG. 4, the solenoid actuation rod 336 is retracted allowing fuel regulating valve 340 to open and close by means of valve stem 346.

Valve stem 346 communicates with, and is advantageously attached to the bottom portion of, fuel regulating valve 340 on one end and upper diaphragm 348 on the other. The upper diaphragm assembly includes upper diaphragm 348, which is sealably housed in diaphragm housing 334 and an upper diaphragm seating spring 350, which engages the underside of upper diaphragm 348 and rests on platform 352. Platform 352 is sealably supported by the sidewalls of diaphragm housing 334. The underside of upper diaphragm 348 and platform 352 in cooperation with the sidewalls of diaphragm housing 334 forms an upper diaphragm chamber 356.

A lower diaphragm assembly resides in the diaphragm housing 334, beneath the upper diaphragm assembly. The lower diaphragm assembly, includes lower diaphragm 360, which is sealably housed in diaphragm housing 334, and a lower diaphragm seating spring 362, which engages the underside of lower diaphragm 360 and rests on the bottom closure of diaphragm housing 334 to form a sealed unit. The upper side of lower diaphragm 360 and the lower side of platform 352 in cooperation with the sidewalls of diaphragm housing 334 form a first lower diaphragm chamber 358. The underside of lower diaphragm 360, and the bottom closure of diaphragm housing 334 in cooperation with the sidewalls of diaphragm housing 334 form a second lower diaphragm chamber 367.

Platform 352 has a pressure equalization port 354, which communicates between the upper diaphragm chamber 356 and first lower diaphragm chamber 358. A pressure equalization tube 364 communicates with second lower diaphragm chamber 367 and ambient. These two devices equalize the pressure between the chambers as the diaphragms deform in operation.

Modulating element 326 sealably attaches to gas metering/shutoff component 318 such that pressure-modulating chamber 366 communicates with lower gas receiving chamber, interior of gas metering/shutoff component 318 and modulating element 326 sealably attaches to manual fuel trim valve assembly housing 328 such that pressure-modulating chamber 366 communicates with the upper gas receiving chamber 376 interior of manual fuel trim valve assembly housing 328.

Manual fuel trim valve assembly housing 328 contains a valve stem 368, which is capped by valve adjustment settings screw 330 and threadably engages treaded sleeve 332. The lower end of valve stem 368 is attached to metal valve plate 370 seated on fuel regulating valve 372. Within manual fuel trim valve assembly housing 328 is a solid separating membrane 374, which divides the manual fuel trim valve assembly housing 328 into an upper gas receiving chamber 376 and a lower gas exiting chamber 378 and contains valve seat 380 therein, such that when fuel regulating valve 372 is fully seated in valve seat 380, gas flow is shut off. Outlet-coupling element 314 carries threaded nipple 382 for connection to a fuel line 16, as seen in FIG. 1.

In operation, the solenoid, which is de-energized so that solenoid actuation rod 336 is in the fully extended position, closes fuel regulating valve 340. Upon ignition of the engine, the solenoid is energized (as shown in FIG. 4) and solenoid actuation rod 336 is fully retracted, allowing modulated opening and closing of fuel regulating valve 340 in response to movement of upper diaphragm 348. Fuel entering, under pressure, through inlet-coupling element 312, passes into upper gas receiving chamber 384 of gas metering/shutoff component 318, through valve seat 342 into lower gas receiving chamber 386, through pressure-modulating chamber 366, into upper gas receiving chamber 376 in manual fuel trim valve assembly housing 328, through valve seat 380, into lower gas exiting chamber 378 and exits outlet-coupling element 314 to fuel line 16 The fuel regulating valve 372 is manually set by means of threadably adjusting valve adjustment settings screw 330 to regulate the maximum gas flow rate through the manual fuel trim valve assembly housing 328.

The pressurization of the air/exhaust gas/fuel mixture by turbocharger 428 creates a vacuum upstream, as previously described. As fuel is pulled through fuel/air venturi 100, it creates a vacuum, which is transferred through fuel line 16 to fuel regulator 300. The vacuum reduces pressure in lower gas exiting chamber 378 and upper gas receiving chamber 376 through pressure-modulating chamber 366 and in lower gas receiving chamber 386. The reduced pressure in lower gas receiving chamber 386 causes upper diaphragm 348 to deform, as shown in FIG. 3, moving valve stem 346 upwardly to open fuel regulating valve 340, as shown. Likewise, the reduction in pressure of upper diaphragm chamber 356 causes a corresponding reduced pressure to equalize through pressure equalization port 354 to create a vacuum in the first lower diaphragm chamber 358 causing lower diaphragm 360 to deform. Pressure equalization tube 364 allows equalization pressure into second lower diaphragm chamber 367 below lower diaphragm 360. Thus, as the vacuum pressure pulled on the fuel in fuel supply conduit 390 fluctuate upper diaphragm seating spring 350 and lower diaphragm seating spring 362 cooperate to attempt to reduce the deformity of upper diaphragm 348 and lower diaphragm 360, respectively, re-seating fuel regulating valve 340 in valve seat 342.

Advantageously, two diaphragms are used, as shown in FIG. 4. This arrangement prevents a harmonic or "fluttering" of the first diaphragm as a vacuum serge is experienced by the fuel regulator device. However, it will be realized by one skilled in the art that a single diaphragm apparatus would be operative in accordance with the instant invention.

Thus, in accordance with the invention, fuel under pressure is introduced into the upper gas receiving chamber 384. Fuel regulating valve 340 is modulated by movement of upper diaphragm 348 in response to vacuum applied to the system by varied throttling of the engine. The fuel regulating valve 372 is manually set to maintain as lean a burn condition as permissible at full load as well as at engine starting to preclude a "too rich" setting causing miss-firing of the sparkplugs and/or damage to the three-way catalyst during engine warm-up. During operation, as the generator experiences a change in load with corresponding changes in engine throttle position, the corresponding increase or decrease in vacuum pressure causes the fuel modulating diaphragm to deform or return to its non-deformed position due to the action of the seating spring. These changes in vacuum cause the diaphragm to slightly "over compensate" for the fuel required for that load change. Rapid, or large load changes with corresponding pressure changes on the fuel-modulating diaphragm cause engine instability.

The pressure modulation chamber, in accordance with the instant invention, unexpectedly modulates the rapid pressure changes reducing the wide variations in the deformation of the fuel modulating diaphragm, which dampens the amplitude of the fuel regulating valve yielding less "overcompensation" to produce smoother engine operation over the full range of load conditions. Thus, rather than dynamically manipulating the valve adjustment settings screw by means of a control system, the modulating chamber allows the system to adjust to surges stabilizing engine operation throughout the full load range. The volume of the chamber and the spacing between the valves caused by inserting the chamber depends upon the system. Modulating element, having a thickness (height) in the range of ¾ to 1.5", is useful in accordance with the system described. Diameters of from about 1.5 to 2.0 inches at the above referenced thickness are found to provide the required volume.

Thus, in accordance with the invention, ambient air (70° F.) flows through air filter to EGR venturi where it is mixed with up to 20% cooled exhaust gas (140° F.) at 100% load. The percent of recycled exhaust gas utilized is a function of engine load. This mixture (120° F.) then passes through the fuel/air venturi where fuel is drawn from the gas regulator and mixed with the ambient air and exhaust gas to be flowed to the intake side of the turbocharger. The fuel/air/recycle exhaust gas mixture is then pressurized by an exhaust gas-powered turbine to a pressure of 15 PSIG of at a temperature of 400° F. This pressurized mixture passes through the turbocharger intercooler, which reduces the pressurized, high temperature mixture to about 165° F. to be introduced into the intake manifold and then to the engine cylinders.

Following combustion, exhaust gas from the cylinders (1100° F.) passes through the coolant-cooled manifolds (FIG. 1) to recover heat, which reduces the exhaust gas temperature to about 940° F. The exit exhaust gas enters the exhaust (turbine section) of the turbocharger and, upon exiting, passes through a "T" with about 80% of the gas being flowed through a catalyst and a heat recovery silencer or muffler as previously described, and exhausted to atmosphere. A second portion comprising about 20% of the exhaust gas is passed through air coolers, as previously described, to the EGR venturi for introduction to the air/fuel intake system. The recycled exhaust gas is cooled by the air coolers to about 110° F. prior to admixing with air in the EGR venturi.

Cooling System

Figure 5:
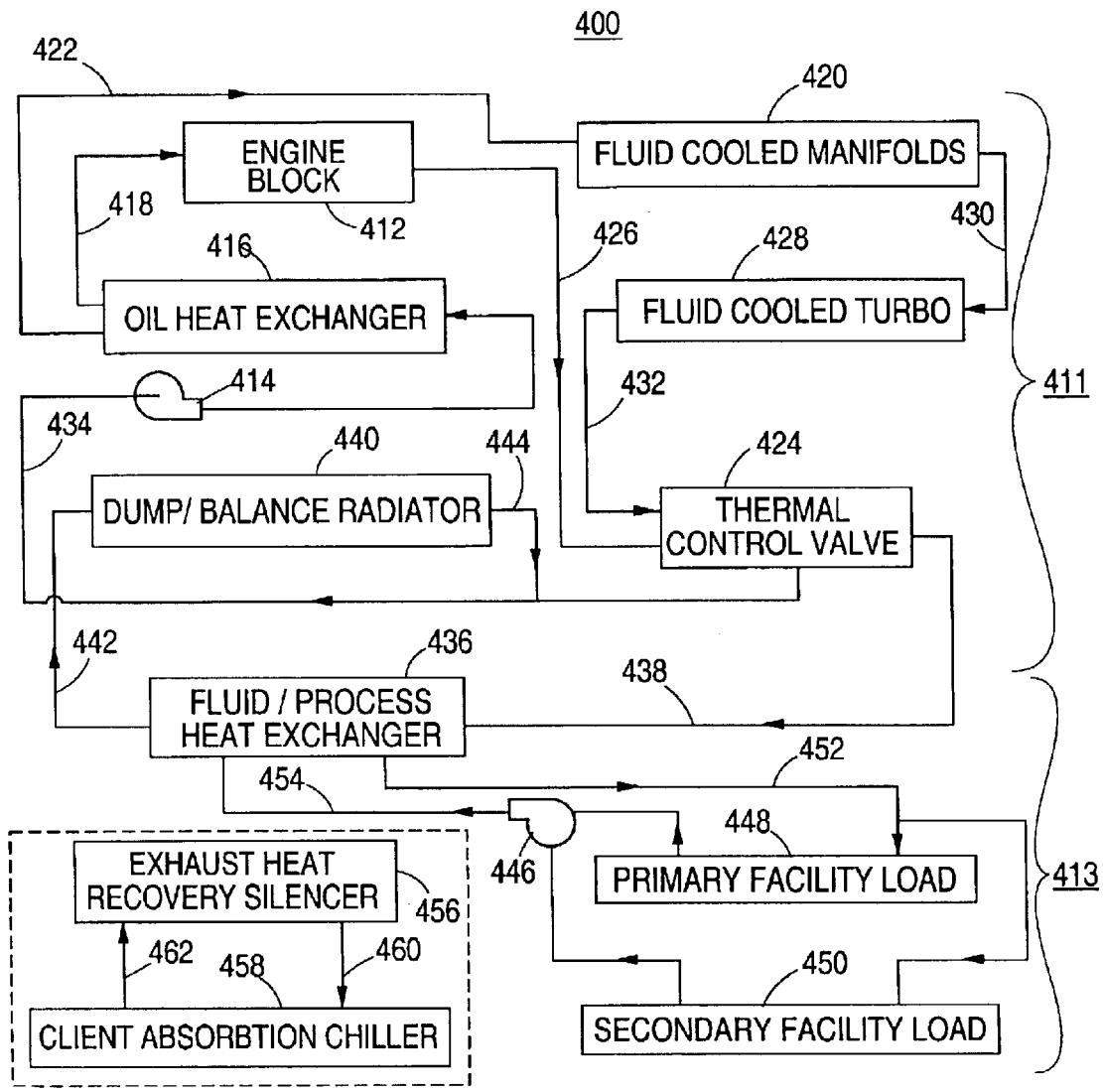

Turning to FIG. 5, in an engine coolant system 411, an engine block 412 contains fluid cooling ports, through which cooling fluid travels by means of internal fluid pump 414 located upstream of oil heat exchanger 416, which is ideally housed within the engine. As shown, oil heat exchanger 416 is in fluid communication with the inlet port of engine block 412 by means of conduit 418 and with inlet of fluid cooled manifold 420 by means of conduit 422. Preferably, oil heat exchanger 416 is contained within engine block 412 and is an integral part thereof. The outlet of engine block 412 communicates with the inlet of thermal control valve 424 by means of conduit 426.

The outlet of fluid cooled manifold 420 communicates with the manifold inlet of fluid cooled turbocharger 428 by means of conduit 430. The outlet of fluid cooled turbocharger 428 communicates with a second inlet of thermal control valve 424 through conduit 432. In a bypass circuit for engine warm up, the outlet of thermal control valve 424 communicates through internal fluid pump 414 with oil heat exchanger 416 through conduit 434. Alternately, during operation thermal control valve 424 communicates through internal fluid pump 414 with oil heat exchanger 416 by way of fluid process/heat exchanger 436 via conduit 438 and dump/balance radiator 440 via conduit 442 and then a T connect of conduit 444 with conduit 434.

This fluid loop comprises the coolant system 411 of the present invention. In operation, internal fluid pump 414 is driven by engine block 412 to flow coolant at a temperature of about 175° F. and a flow rate of about 106 GPM through oil heat exchanger 416 and simultaneously through conduit 418 to the inlet of engine block 412 at a temperature of about 182° F. and a flow rate of about 91 GPM and conduit 422 at a temperature of about 182° F. and a flow rate of about 26 GPM to inlet of fluid cooled manifolds 420.

As shown in FIG. 5, there are two fluid cooled manifolds. The first, fluid cooled manifold 420 and the second fluid cooled turbocharger 428. It will be realized that one or more liquid cooled manifolds for removing heat from the engine exhaust can be utilized. The function of these manifolds is to cool exhaust and generate heat to the cooling fluid, which will be transferred to the cogeneration client as described below.

Coolant, exiting from exhaust-manifolds at a temperature of about 210° F. and a flow rate of about 26 GPM, flows to thermal control valve 424, which functions to limit fluid circulation back to inlet of the engine block 412 until operating temperature of the system is attained, and thereafter through conduit 438 to fluid process/heat exchanger 436. Coolant exiting from engine block 412 at a temperature of about 198° F. and a flow rate of about 91 GPM, flows to thermal control valve 424 where is merges with the coolant from fluid cooled manifold 420. Dump/balance radiator 440 serves as a cooling radiator for the system to balance coolant inlet temperature to the oil heat exchanger 416 if fluid process/heat exchanger 436 removes insufficient heat or is turned off.

As shown in FIG. 5, fluid process/heat exchanger 436 is a radiator which allows heat transfer from coolant system 411 to cogeneration process/utility heat system 413. Cogeneration process/utility system comprises a closed loop to circulate fluid, which is heated in fluid process/heat exchanger 436, by means of pump 446. Fluid process/heat exchanger 436 communicates with primary facility load 448 and secondary facility load 450 by means of conduit 452 and return conduit 454.

In operation, fluid process/heat exchanger 436 which contains coolant fluid at a temperature of about 206° F. at a flow rate of about 106 GPM, provides heat exchange between coolant system 411 and cogeneration process/utility heat system 413, which provides heated liquid to the client in a cogeneration configuration. Thus, the cogeneration client receives transferred heat from the coolant system 411 by way of fluid process/heat exchanger 436 to the cogeneration process/utility heat system 413. The coolant in coolant system 411 is then heat balanced, if necessary, in the dump/balance radiator 440 to return through internal fluid pump 414 to oil heat exchanger 416 to loop at a temperature of about 175° F. at a flow rate of about 106 GPM.

Thus, for example heat in coolant flow, through the coolant/process heat exchanger, is captured for the cogeneration client use by counter flowing process/utility water flowing through the coolant/process heat exchanger. Thermal regulating valves can be used to regulate process/utility water temperature to insure appropriate water temperature delivery to the cogeneration use.

In accordance with one aspect of the invention, as shown in FIG. 1 an exhaust heat recovery silencer 456, further cools the exhaust from the engine block 412 through three-way catalyst 52 and communicates through client absorption chiller 458 (FIG. 5) by means of conduit 460 and return conduit 462, as will be further described below. In operation, internal fluid pump 414 is driven by engine block 412 to flow coolant at a temperature of about 175° F. and a flow rate of about 106 GPM through oil heat exchanger 416 and simultaneously through conduit 18 to the inlet of engine block 412 at a temperature of about 182° F. and a flow rate of about 91 GPM and conduit 422 at a temperature of about 182° F. and a flow rate of about 426 GPM to inlet of fluid cooled manifold 420.

Returning to FIG. 1, fluid process/heat exchanger 436 is a radiator, which allows heat transfer from coolant system 411 to cogeneration process/utility heat system 413. Cogeneration process/utility system comprises a closed loop to circulate fluid, which is heated in fluid process/heat exchanger 436, by means of pump 446. Fluid process/heat exchanger 436 communicates with primary facility load 448 and secondary facility load 450 by means of conduit 452 and return conduit 454.

Thus, for example heat in coolant flow, through the coolant/process heat exchanger, is captured for the cogeneration client use by counter flowing process/utility water flowing through the coolant/process heat exchanger. Thermal regulating valves can be used to regulate process/utility water temperature to insure appropriate water temperature delivery to the cogeneration use.

The foregoing discussions, and examples, describe only specific embodiments of the present invention. It should be understood that a number of changes might be made, without departing from its essence. In this regard, it is intended that such changes—to the extent that they achieve substantially the same result, in substantially the same way—would still fall within the scope and spirit of the present invention.

What is claimed is:

1. A cogeneration system for supplying distributed generation of electricity and process/utility heat to a cogeneration client driven by a natural gas fired, internal combustion engine using EGR and having a carburetion system and an engine cooling/heat transfer system, with reduced fuel consumption and pollutants, while delivering substantially increased heat to the process/utility heat facility comprises:

a. a carburetion system comprising:
  i. at least one recycled exhaust gas venturi for admixing intake air and recycled exhaust from said engine; and,
  ii. at least one fuel venturi, downstream of said recycled exhaust gas venturi, for admixing fuel and the confluent from said recycled exhaust gas venturi wherein said venturi are in a spaced apart relationship, proximate one to another, to provide an effective amount of exhaust gas to be admixed with said intake air prior to entering the fuel venturi, to maintain the engine operation at substantially stoicheiometric through out the engine range while reducing pollutants; and, b. a heat transfer and cooling system comprising:
  i. a fluid system for cooling said internal combustion engine having a first loop containing a cooling fluid which fluidly communicates with the cooling ports of said internal combustion engine at a first inlet temperature and a first flow rate; and, a second loop containing a cooling fluid which fluidly communicates with the cooling ports of at least one exhaust manifold of said internal combustion engine at a second inlet temperature and a second flow rate, wherein the cooling fluid exiting said first loop at a first exit temperature and the cooling fluid exiting said second loop at a second exit temperature second loop converge in a confluence at one or more process heat exchanger; and,
  ii. a cogeneration process/utility heat loop containing a heat receiving medium and in communication with said at least one process heat exchanger containing said confluence from said cooling system such that heat contained in said confluence from said cooling system is passed to the media of said cogeneration process/utility heat loop to provide process/utility heat.

2. The cogeneration system of claim 1 wherein said fuel is dispersed into said intake air exhaust gas admixture in said fuel venturi by means of a circumferentially disposed fuel distribution conduit, which communicates with numerous fuel injection ports to disperse said fuel into said intake air exhaust gas admixture.

3. The cogeneration system of claim 1 wherein said exhaust gas is distributed into said intake air by means of an EGR inlet conduit, which protrudes into the air stream created in a mixing chamber within said recycled exhaust gas venturi to aspirate recycled exhaust gas from said EGR inlet conduit.

4. The cogeneration system of claim 1 wherein the spaced apart relationship between said recycled exhaust gas venturi and said fuel venturi is from about 12" to about 26".

5. The cogeneration system of claim 1 further comprising a natural gas fuel regulator device for regulating natural gas flow to the fuel venturi of said carburetion system comprising:
   a. a gas metering element having a housing defining a divided chamber having a first receiving chamber portion in communication with natural gas from a source, and a second chamber portion, and having a valve between said first receiving chamber portion and said second chamber portion for metering gas through said gas metering element in response to pressure changes in said second chamber portion;
   b. a fuel trim element having a housing defining a divided chamber having a first chamber portion and a second exiting chamber portion in communication with said carburetion system wherein said carburetion system communicates pressure changes to said second exiting chamber in response to change in said internal combustion engine speed and having a valve between said first chamber portion and said exit chamber portion for maintaining a flow of said gas through said fuel trim element, and
   c. a pressure-modulating element defining a pressure-modulating chamber, the inlet side of which communicates with the second chamber portion of said gas metering element and the exit side of which communicates with the first chamber portion of said fuel trim element such that the pressure-modulating chamber is effective to dampen the amplitude of pressure changes from said carburetion system.

6. The device of claim 5 wherein said valve between said first receiving chamber portion and said second chamber portion is actuated by at least one diaphragm which deforms in response to said pressure changes in said second chamber portion.

7. The device of claim 6 wherein said at least one diaphragm comprises two diaphragms which operated in concert, one with the other, in response to said pressure changes in said second chamber portion.

8. The device of claim 5 wherein said valve in said fuel trim element is maintained in fixed flow position by means of a manually operated setscrew.

9. The device of claim 5 wherein said gas metering element further comprises a shutoff mechanism which communicates with said gas metering element valve to prevent flow from said first receiving chamber portion to said second chamber portion.

10. The device of claim 9 wherein said shutoff mechanism comprises an electrically operated solenoid.

11. The device of claim 5 wherein said pressure-modulating chamber has a volume of from about 12 cubic inches to about 16 cubic inches and said pressure-modulating element is from about 0.75 inches to about 1.0 inch in length.

12. The device of claim 5 wherein said natural gas from a source is delivered to said first receiving chamber at a pressure of from about 1.5 to 2.0 psig.

13. The device of claim 5 wherein said internal combustion engine is turbo-charged.

14. The cogeneration system of claim 1 wherein said fluid system further comprises at least one dump balance radiator in fluid communication with said at least one process heat exchanger to remove heat from said cooling system prior to the return of the cooling system fluid to said engine.

15. The cogeneration system of claim 1 wherein said fluid system further comprises an oil heat exchanger in fluid communication with the engine coolant pump on the oil heat exchanger inlet and is in fluid communication each one of said two loops on the oil heat exchanger outlet.

16. The cogeneration system of claim 1 wherein said fluid system further comprises a thermal control valve which fluidly communicates on the inlet side of said thermal control valve with said confluence and fluidly communicates on the outlet side of said thermal control valve with said at least one process heat exchanger or said oil heat exchanger depending on the temperature of said confluence.

17. The cogeneration system of claim 1 further comprising a turbo intercooler unit for cooling the compressed air/recycle exhaust gas/fuel intake admixture prior to said admixture entering the engine intake manifold.

18. The cogeneration system of claim 17 wherein said turbo intercooler unit comprises a fluid cooled compressed air/recycle exhaust gas/fuel intake admixture radiator in liquid communication with an intercooler radiator for exhausting heat from said coolant and a circulation pump for circulating said coolant.

19. The cogeneration system of claim 1 further comprising at least one exhaust gas recycle cooler for cooling the recycled exhaust gas prior to forming the air/recycle exhaust gas/fuel intake admixture.

20. The cogeneration system of claim 19 wherein said at least one exhaust gas recycle cooler for cooling the recycled exhaust gas prior to forming the air/recycle exhaust gas/fuel intake admixture comprises two air cooled units in series.

21. The cogeneration system of claim 1 wherein said at least one exhaust manifold of said internal combustion engine comprises two exhaust manifolds one in heat exchange communication with said engine exhaust ports and the second in communication with the exhaust exiting a turbocharger.

22. The cogeneration system of claim 1 wherein said cogeneration process/utility heat loop further comprises a client absorption chiller in fluid communication with an exhaust heat recovery device such that non recycled engine exhaust is passed through said exhaust heat recovery device to transfer heat in the non recycled engine exhaust by way of the client absorption chiller to said cogeneration process/utility heat loop.

23. A method for cogeneration of distributed electricity and process/utility heat to a cogeneration client using a natural gas fired, internal combustion engine driver employing EGR and having a carburetion system and an engine cooling/heat transfer system, for reducing fuel consumption and pollutants, while delivering substantially increased heat to the process/utility heat facility comprising the steps of:
   a. carbureting a natural gas fired, internal combustion engine using EGR comprising:
      i. admixing intake air and recycled exhaust from said engine in at least one recycled exhaust gas venturi; and,
      ii. admixing fuel and the confluent from said recycled exhaust gas venturi in at least one fuel venturi, downstream of said recycled exhaust gas venturi, wherein said venturi are in a spaced apart relationship, proximate one to another, to provide a effective ratio of exhaust gas to intake air prior to entering the fuel venturi to maintain the engine operation at substantially stoicheiometric through out the engine range while reducing pollutants; and, b. increasing the transfer of heat to a process/utility heat loop from a liquid cooling system for efficiently cooling a natural gas fueled, internal combustion engine utilizing recycled exhaust gas comprising:

i. circulating a cooling fluid for cooling said internal combustion engine through a first loop which fluidly communicates with the cooling ports of said internal combustion engine at a first inlet temperature and at a first flow rate; and, through a second loop containing a cooling fluid which fluidly communicates with the cooling ports of at least one exhaust manifold of said internal combustion engine at a second inlet temperature and at a second flow rate, such that the cooling fluid exiting said first loop at a first exit temperature and the cooling fluid exiting said second loop at a second exit temperature second loop converge in a confluence at one or more process heat exchangers; and, ii. circulating a heat exchange media in a cooling a cogeneration process/utility heat loop in communication with said at least one process heat exchanger containing said confluence from said cooling system such that said heat contained in said confluence from said cooling system is passed to the media of said cogeneration process/utility heat loop to provide process/utility heat.

24. The method of claim 23 wherein said fuel is dispersed into said fuel venturi by means of a circumferentially disposed fuel distribution conduit, which communicates with numerous fuel injection ports for admixing said fuel and intake air-exhaust gas admixture.

25. The method of claim 23 wherein said exhaust gas is distributed into said recycled exhaust gas venturi by means of an EGR inlet conduit, which protrudes into the air stream created in a mixing chamber within said recycled exhaust gas venturi to aspirate recycled exhaust gas from said EGR inlet conduit for admixing said intake air with said recycled exhaust gas.

26. The method of claim 23 wherein the spaced apart relationship between said recycled exhaust gas venturi and said fuel venturi is from about 12" to about 26".

27. The method of claim 23 wherein said method for carbureting said natural gas fired internal combustion engine further comprising the step of:

regulating natural gas fuel flow to the carburetion system by metering said gas from a natural gas fuel source in response to modulated pressure changes in said carburetion system; and, modulating said pressure from said carburetion system by means of a modulating chamber to produce said modulated pressure changes.

28. The method of claim 27 wherein said method for regulating natural gas fuel flow further comprises maintaining a flow of said natural gas to said carburetion system by means of a trimming valve.

29. The method of claim 27 wherein said metering is accomplished by a valve.

30. The method of claim 29 wherein said valve is actuated by least one diaphragm, which deforms in response to modulated pressure changes.

31. The method of claim 29 wherein said valve can be closed to prevent natural gas fuel flow from said natural gas fuel source to said carburetion system.

32. The method of claim 31 wherein said valve is closed by means of an electrically operated solenoid.

33. The method of claim 27 wherein said fuel trim valve is manually operated setscrew.

34. The method of claim 27 wherein said pressure-modulating chamber has a volume of from about 12 cubic inches to about 16 cubic inches and said pressure-modulating element is from about 0.75 inches to about 1.0 inch in length.

35. The method of claim 27 wherein said natural gas fired internal combustion engine is turbo charged.

36. The method of claim 23 wherein said cooling fluid is further passed though at least one dump balance radiator in fluid communication with said at least one process heat exchanger to remove heat from said cooling system prior to the return of the cooling system fluid to said engine.

37. The method of claim 23 wherein said cooling fluid is further passed though a oil heat exchanger in fluid communication with the engine coolant pump on the oil heat exchanger inlet and is in fluid communication each one of said two loops on the oil heat exchanger outlet.

38. The method of claim 23 wherein said cooling fluid is further passed through a thermal control valve which fluidly communicates on the inlet side of said thermal control valve with said confluence and fluidly communicates on the outlet side of said thermal control valve with said at least one process heat exchanger or said oil heat exchanger depending on the temperature of said confluence.

39. The method of claim 23 comprising the further step of passing cooling fluid through a turbo intercooler third loop, which is not in liquid communication with said first or said second loop, for cooling the compressed air/recycle exhaust gas/fuel intake admixture prior to said admixture entering the engine intake manifold.

40. The method of claim 39 wherein said turbo intercooler loop comprises a fluid cooled compressed air/recycle exhaust gas/fuel intake admixture radiator in liquid communication with an intercooler radiator for exhausting heat from said coolant and a circulation pump for circulating said cooling fluid.

41. The method of claim 23 comprising the further step of cooling the recycled exhaust gas prior to forming the air/recycle exhaust gas/fuel intake admixture.

42. The method of claim 41 wherein said cooling step comprises passing said recycle exhaust gas through two air cooled units in series prior to forming the air/recycle exhaust gas/fuel intake admixture.

43. The method of claim 23 wherein said at least one exhaust manifold of said internal combustion engine comprises two exhaust manifolds one in heat exchange communication with said engine exhaust ports and the second in communication with the exhaust exiting a turbocharger.

44. A carburetion system for a natural gas fired, internal combustion engine using EGR comprising:

a. at least one recycled exhaust gas venturi for admixing intake air and recycled exhaust from said engine;

b. at least one fuel venturi, downstream of said recycled exhaust gas venturi, for admixing fuel and the confluent from said recycled exhaust gas venturi wherein said venturi are in a spaced apart relationship, proximate one to another, to provide an effective amount of exhaust gas to be admixed with said intake air prior to entering the fuel venturi, to maintain the engine operation at substantially stoicheiometric through out the engine range while reducing pollutants.

c. a gas metering element having a housing defining a divided chamber having a first receiving chamber portion in communication with natural gas from a source, and a second chamber portion, and having a valve between said first receiving chamber portion and said second chamber portion for metering gas through said gas metering element in response to pressure changes in said second chamber portion;

d. a fuel trim element having a housing defining a divided chamber having a first chamber portion and a second exiting chamber portion in communication with said carburetion system wherein said carburetion system communicates pressure changes to said second exiting chamber in response to change in said internal combustion engine speed and having a valve between said first chamber portion and said exit chamber portion for maintaining a flow of said gas through said fuel trim element, and e. a pressure-modulating element defining a pressure-modulating chamber, the inlet side of which communicates with the second chamber portion of said gas metering element and the exit side of which communicates with the first chamber portion of said fuel trim element such that the pressure-modulating chamber is effective to dampen the amplitude of pressure changes from said carburetion system.

45. The device claim 44 wherein said valve between said first receiving chamber portion and said second chamber portion is actuated by at least one diaphragm which deforms in response to said pressure changes in said second chamber portion.

46. The device of claim 45 wherein said at least one diaphragm comprises two diaphragms which operated in concert, one with the other, in response to said pressure changes in said second chamber portion.

47. The device of claim 44 wherein said valve in said fuel trim element is maintained in fixed flow position by means of a manually operated setscrew.

48. The device of claim 44 wherein said gas metering element further comprises a shutoff mechanism which communicates with said gas metering element valve to prevent flow from said first receiving chamber portion to said second chamber portion.

49. The device of claim 48 wherein said shutoff mechanism comprises an electrically operated solenoid.

50. The device of claim 44 wherein said pressure-modulating chamber has a volume of from about 12 cubic inches to about 16 cubic inches and said pressure-modulating element is from about 0.75 inches to about 1.0 inch in length.

51. The device of claim 44 wherein said natural gas from a source is delivered to said first receiving chamber at a pressure of from about 1.5 to 2.0 psig.

52. A method for carbureting a natural gas fired, internal combustion engine using EGR comprising:

a. admixing intake air and recycled exhaust from said engine in at least one recycled exhaust gas venturi; admixing fuel and the confluent from said recycled exhaust gas venturi mat least one fuel venturi, downstream of said recycled exhaust gas venturi, wherein said venturi are in a spaced apart relationship, proximate one to another, to provide a effective ratio of exhaust gas to intake air prior to entering the fuel venturi to maintain the engine operation at substantially stoicheiometric through out the engine range while reducing pollutants;

b. regulating natural gas fuel flow to the carburetion system by metering said gas from a natural gas fuel source in response to modulated pressure changes in said carburetion system; and, modulating said pressure from said carburetion system by means of a modulating chamber to produce said modulated pressure changes.

53. The method of claim 52 wherein said method for regulating natural gas fuel flow further comprises maintaining a flow of said natural gas to said carburetion system by means of a trimming valve.

54. The method of claim 52 wherein said metering is accomplished by a valve.

55. The method of claim 54 wherein said valve is actuated by least one diaphragm, which deforms in response to modulated pressure changes.

56. The method of claim 54 wherein said valve can be closed to prevent natural gas fuel flow from said natural gas fuel source to said carburetion system.

57. The method of claim 56 wherein said valve is closed by means of an electrically operated solenoid.

58. The method of claim 53 wherein said fuel trim valve is manually operated setscrew.

59. The method of claim 52 wherein said pressure-modulating chamber has a volume of from about 12 cubic inches to about 16 cubic inches and said pressure-modulating element is from about 0.75 inches to about 1.0 inch in length.

60. The method of claim 52 wherein said natural gas fired internal combustion engine is turbo charged.

* * * * *